United States Patent
Lee et al.

(10) Patent No.: US 10,658,946 B2
(45) Date of Patent: May 19, 2020

(54) DEVICE FOR DETERMINING PEAK CURRENT IN INVERTER

(71) Applicant: LSIS CO., LTD., Anyang-si, Gyeonggi-do (KR)

(72) Inventors: Jae-Moon Lee, Anyang-si (KR); Chun-Suk Yang, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 16/283,059

(22) Filed: Feb. 22, 2019

(65) Prior Publication Data

US 2019/0305693 A1 Oct. 3, 2019

(30) Foreign Application Priority Data

Mar. 27, 2018 (KR) ........................ 10-2018-0035125

(51) Int. Cl.
*H02M 7/5387* (2007.01)
*H02H 7/122* (2006.01)
(Continued)

(52) U.S. Cl.
CPC ........ *H02M 7/5387* (2013.01); *H02H 7/1227* (2013.01); *H02M 1/32* (2013.01);
(Continued)

(58) Field of Classification Search
CPC ........... H02P 27/08; H02M 1/32; H02M 5/40; H02M 5/458; H02M 7/162; H02M 7/1623;
(Continued)

(56) References Cited

U.S. PATENT DOCUMENTS 7,583,523 B2 * 9/2009 Goto .................. B60H 1/00428
363/98
7,626,838 B2 * 12/2009 Gunji ................ H02M 7/53873
363/56.04
(Continued)

FOREIGN PATENT DOCUMENTS

CN 102480245 A 5/2012
KR 20000046295 A 7/2000
(Continued)

OTHER PUBLICATIONS

European Search Report for related European Application No. 19160646.6; action dated Jul. 23, 2019; (7 pages).
(Continued)

*Primary Examiner* — Matthew V Nguyen
(74) *Attorney, Agent, or Firm* — K&L Gates LLP

(57) ABSTRACT

Disclosed is a device for detecting an instantaneous maximum output current of an inverting module as a peak-current thereof. The inverting module converts a direct current (DC) link voltage to an alternate current (AC) voltage, and includes three-phases legs. Each leg has lower and upper switching elements connected in series. The device includes a shunt resistor serially connected to a lower switching element of each leg of the inverting module; a current detection module configured for detecting an output current from a signal output from each shunt resistor; and a summer configured for receiving and summing the detected output currents from the current detection module and outputting the instantaneous maximum output current of the inverting module as the peak-current thereof.

6 Claims, 17 Drawing Sheets

(51) Int. Cl.
     *H02P 27/08*    (2006.01)
     *H02M 5/458*    (2006.01)
     *H02M 1/32*     (2007.01)
     *H02M 1/00*     (2006.01)

(52) U.S. Cl.
     CPC ............ *H02M 5/458* (2013.01); *H02P 27/08* (2013.01); *H02M 2001/0009* (2013.01)

(58) Field of Classification Search
     CPC .. H02M 7/1626; H02M 7/219; H02M 7/5387; H02M 7/53871; H02M 7/53875; H02H 7/1227
     See application file for complete search history.

(56) References Cited

U.S. PATENT DOCUMENTS

| | | | |
|---|---|---|---|
| 2009/0184673 A1 | 7/2009 | Lee et al. | |
| 2017/0141713 A1* | 5/2017 | Mori | H02P 6/14 |
| 2018/0323613 A1* | 11/2018 | Fujimoto | H02P 27/06 |

FOREIGN PATENT DOCUMENTS

| | | |
|---|---|---|
| KR | 1020050122472 A | 12/2005 |
| KR | 101261793 B1 | 5/2013 |

OTHER PUBLICATIONS

Korean Office Action for related Korean Application No. 10-2018-0035125; action dated Mar. 18, 2019; (5 pages).

* cited by examiner

Inverter switching state: (1,0,0)
Ius' = 0 // Ivs' = =Ivs // Iws' = -Iws

Inverter switching state: (0,1,0)
Ius' = -Ius // Ivs' = 0 // Iws' + = -Iws

Inverter switching state: (0,0,1)
Ius' = Ius // Ivs' = -Ivs // Iws' = 0

Inverter switching state: (0,0,0)
Ius' = -Ius // Ivs' = -Ivs // Iws' = -Iws

Inverter switching state: (0,1,1)
Ius' = -Ius // Ivs' = 0 // Iws' = 0

Inverter switching state: (1,0,1)
Ius' = 0 // Ivs' = -Ivs // Iws' = 0

Inverter switching state: (1,1,0)
Ius' = 0 // Ivs' = 0 // Iws' = -Iws

Inverter switching state: (1,1,1)
Ius' = 0 // Ivs' = 0 // Iws' = 0

FIG. 5B

Sector 2

| | T0 | T1 | T2 | T0 | | | | |
|---|---|---|---|---|---|---|---|---|
| Sa | 0 | 0 | 1 | 1 | 1 | 1 | 0 | 0 |
| Sb | 0 | 1 | 1 | 1 | 1 | 1 | 1 | 0 |
| Sc | 0 | 0 | 0 | 1 | 1 | 0 | 0 | 0 |

On Sequence | Off Sequence

FIG. 5C

Sector 3

| | T0 | T1 | T2 | T0 | | | | |
|---|---|---|---|---|---|---|---|---|
| Sa | 0 | 0 | 0 | 1 | 1 | 0 | 0 | 0 |
| Sb | 0 | 1 | 1 | 1 | 1 | 1 | 1 | 0 |
| Sc | 0 | 0 | 1 | 1 | 1 | 1 | 0 | 0 |

On Sequence | Off Sequence

FIG. 5D

Sector 4

| | T0 | T1 | T2 | T0 | | | | |
|---|---|---|---|---|---|---|---|---|
| Sa | 0 | 0 | 0 | 1 | 1 | 0 | 0 | 0 |
| Sb | 0 | 0 | 1 | 1 | 1 | 1 | 0 | 0 |
| Sc | 0 | 1 | 1 | 1 | 1 | 1 | 1 | 0 |

On Sequence | Off Sequence

FIG.5E

Sector 5

| | T0 | T1 | T2 | T0 | | | | |
|---|---|---|---|---|---|---|---|---|
| Sa | 0 | 0 | 1 | 1 | 1 | 1 | 0 | 0 |
| Sb | 0 | 0 | 0 | 1 | 1 | 0 | 0 | 0 |
| Sc | 0 | 1 | 1 | 1 | 1 | 1 | 1 | 0 |

On Sequence | Off Sequence (a)

(b)

(c)

(d)

(e)

(a)

(b)

DEVICE FOR DETERMINING PEAK CURRENT IN INVERTER

CROSS-REFERENCE TO RELATED APPLICATION

Pursuant to 35 U.S.C. § 119(a), this application claims the benefit of earlier filing date and right of priority to Korean Application No. 10-2018-0035125, filed on Mar. 27, 2018, which is herein expressly incorporated by reference in its entirety.

TECHNICAL FIELD

The present disclosure relates to an inverter peak-current detection device. More specifically, the present disclosure is directed to an inverter peak-current detection device that detects a peak-current as an instantaneous maximum output current in an inverter to protect the inverter from overcurrent.

BACKGROUND

Generally, an inverter is an inverse conversion device that electrically converts DC to AC. An inverter used in the industry is defined as a series of devices that control a motor speed such that the motor is used with a high efficiency by receiving a power supplied from a commercial power supply and varying a voltage and frequency of the power by itself and supplying the varied power to the motor. The inverter is controlled via a variable voltage variable frequency (VVVF) scheme. The inverter may vary a voltage and frequency input to the motor based on a pulse width modulation (PWM) output.

A slip frequency of the motor is defined as a difference between a rotational speed of the motor and a rotating field generated by the inverter. When the slip frequency of the motor increases greatly, overcurrent will occur and thus the inverter or motor will be damaged. To prevent this damage, when the overcurrent occurs, the inverter may suppress the overcurrent or generate a trip signal to protect the inverter and motor.

When the overcurrent protection operation is performed to protect the inverter from the overcurrent, a peak value of the output current of the inverter (hereinafter, a peak-current) may be detected.

Conventionally, there may occur a period in which the detection of the peak current is not available based on the output current state of the inverter. Thus, even when a current level exceeds the overcurrent level, the overcurrent suppression may not be realized in the period. Thus, there arises a problem that internal elements of the inverter may be damaged due to the overcurrent and a trip may occur due to overheating.

SUMMARY

In order to solve the problem, a purpose of the present disclosure is to provide an inverter peak-current detection device capable of peak-current detection throughout an entire period of a powering mode of an inverter in an inverter system that detects an inverter output current by a shunt resistor.

The purpose of the present disclosure is not limited to the above-mentioned purposes. Other purposes and advantages of the present disclosure that are not mentioned may be understood by following descriptions, and will be more clearly understood by embodiments of the present disclosure. It is to be further understood that the purposes and advantages of the present disclosure may be realized and attained by means of means and combinations thereof recited in the appended claims.

In one aspect of the present disclosure, there is provided a device for detecting an instantaneous maximum output current of an inverting module as a peak-current thereof, wherein the inverting module converts a direct current (DC) link voltage to an alternate current (AC) voltage, and includes three-phases legs, wherein each leg has lower and upper switching elements connected in series, wherein the device comprises: a shunt resistor serially connected to a lower switching element of each leg of the inverting module; a current detection module configured for detecting an output current from a signal output from each shunt resistor; and a summer configured for receiving and summing the detected output currents from the current detection module and outputting the instantaneous maximum output current of the inverting module as the peak-current thereof.

In one implementation, the summer includes an operational amplifier.

In one implementation, the detected output currents from the current detection module are input to an inverting input terminal of the operational amplifier.

In one implementation, the detected output currents from the current detection module are input to a non-inverting input terminal of the operational amplifier.

In one implementation, the three phases include first, second, and third phases, wherein for a duration in which a current pathway to a lower switching element of each of first and second phases legs of the three-phases legs is established, the current detection module detects first and second phases output currents, wherein the summer sums the first and second phases output currents and outputs a third phase output current as the peak-current of the inverting module.

In one implementation, the three phases include first, second, and third phases, wherein for a duration in which a current pathway to a lower switching element of a first phase leg is established, the current detection module detects a first phases output current, wherein the summer outputs the first phase output current as the peak-current of the inverting module.

In one implementation, the device further comprises an offset adjustment module configured for supplying an offset voltage to the summer.

According to the present disclosure, the instantaneous peak-current can be detected in the entire period of the powering mode of the inverter. This may allow a stable overcurrent suppression operation.

Further specific effects of the present disclosure as well as the effects as described above will be described in conduction with illustrations of specific details for carrying out the invention.

BRIEF DESCRIPTION OF THE DRAWINGS

FIG. 4 shows a switching element behavior according to an inverter switching state.

FIGS. 5A to 5F show an operation of a switching element in each SVPWM sector.

FIG. 6 is a block diagram of an inverter overcurrent protection system using a shunt resistor-based current detection scheme.

DETAILED DESCRIPTION

Figure 1:
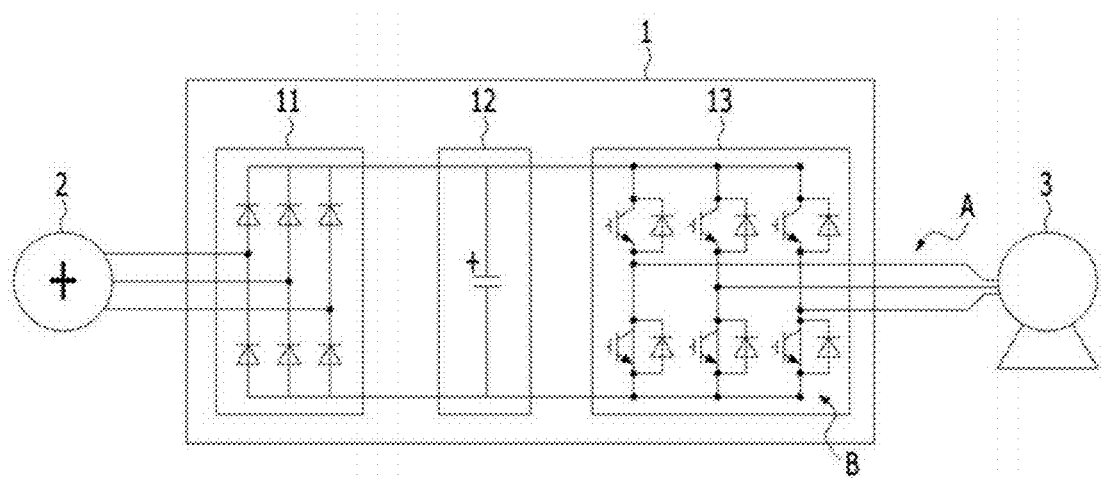
FIG. 1 shows a configuration of a conventional inverter.

Hereinafter, a device for detecting a peak-current in an inverter in accordance with the present disclosure will be described with reference to the accompanying drawings.

For simplicity and clarity of illustration, elements in the figures are not necessarily drawn to scale. The same reference numbers in different figures denote the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Embodiments are described in sufficient detail to enable those skilled in the art in the art to easily practice the technical idea of the present disclosure. It is intended to cover alternatives, modifications, and equivalents as may be included within the spirit and scope of the present disclosure as defined by the appended claims.

Unless defined otherwise, all terms used herein have the same meaning as commonly understood by one of ordinary skill in the art. When the terms used herein are in conflict with a general meaning of the term, the meaning of the term is in accordance with a definition used herein.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

A current detection in an general-purpose inverter mainly uses a CT or a shunt resistor. In the current detection scheme using the CT, the current detection may be performed by isolating an inverting module 13 and an inverter controller (not shown) from each other. Thus, no separate isolation circuit is required. However, there is a non-linear region. Further, this approach is relatively expensive compared to the current detection scheme using the shunt resistor.

The current detection scheme using the shunt resistor allows the current detection in a wide linear region and allows low-cost implementation of a current detection circuit. This approach is mainly applied to an compact-class inverter which requires price competitiveness. However, the current detection scheme using the shunt resistor requires separate current detection control according to a switching state. Thus, a relatively complicated current detection circuit and control are required compared with the CT based scheme.

The present disclosure is to detect a maximum current in an entire period of a powering mode of a motor in the current detection scheme using the shunt resistor, thereby to perform a stable current suppression operation.

Hereinafter, an output current detection scheme in a conventional inverter system will be described with reference to FIGS. 1 to 9. Referring to FIGS. 10 to 13, an inverter peak-current detection device in accordance with an embodiment of the present disclosure will be described.

FIG. 1 shows a configuration of a conventional inverter.

Generally, an inverter 1 receives AC power of three phases from a power supply 2. Then, a rectifying module 11 in the inverter 1 rectifies the received AC power to DC power. Then, a smoothening module 12 in the inverter 1 smoothens and stores DC voltage from the rectifying module 11. An inverting module 13 in the inverter 1 converts the DC voltage stored in a DC link capacitor as the smoothening module 12 to an AC voltage having a predetermined voltage and frequency according to a PWM control signal. Then, the inverter 1 provides the converted AC voltage to the motor 3. To this end, the inverting module 13 has three legs. Each leg is composed of two switching elements connected in series.

Overcurrent detection is required to protect the inverter from overcurrent. For such overcurrent detection, a current transformer (CT) is placed at an output A of the inverter 1 to detect an inverter output current. Alternatively, a shunt resistor is connected in series with a lower switching element of a leg B of the inverting module 13, and the output current of the inverting module 13 is detected using the shunt resistor. In this connection, the overcurrent protection operation is performed by detecting a peak value (peak-current) of the output current of the inverting module 13.

Figure 2:
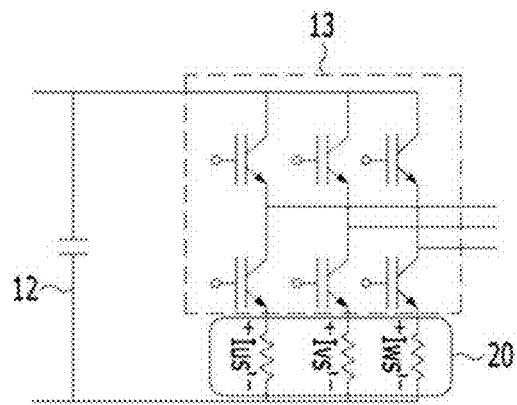
FIG. 2 shows an example of a scheme for detecting an inverter output current using a shunt resistor.
Figure 3A:
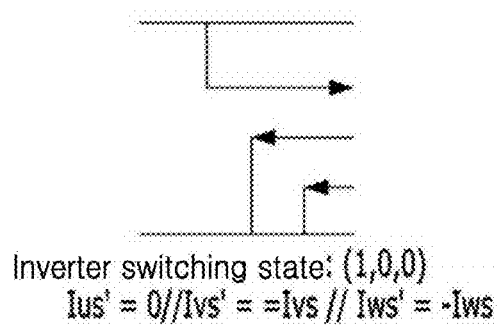
FIGS. 3A to 3H show a state of an inverter output current according to a switching state during a space vector pulse width modulation (SVPWM) control.
Figure 3B:
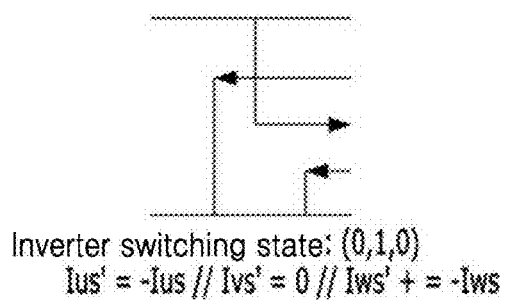
Figure 3C:
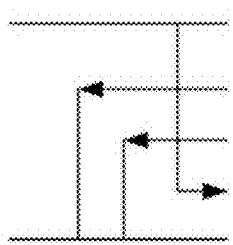
Figure 3D:
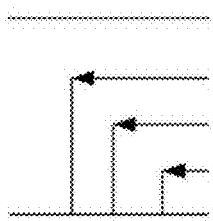
Figure 3E:
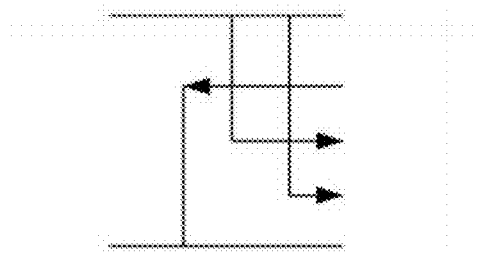
Figure 3F:
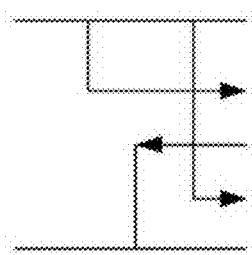
Figure 3G:
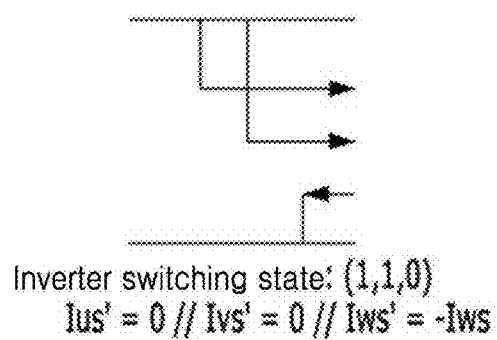
Figure 3H:
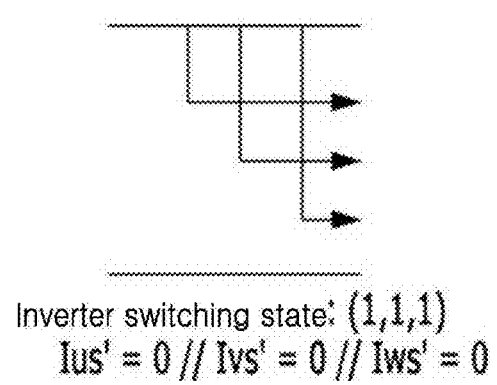

FIG. 2 shows an example of the scheme for detecting the inverter output current using the shunt resistor.

The current detection scheme using the shunt resistor is achieved by placing a shunt resistor 20 at an emitter of a lower switching element (e.g., insulated gate bipolar transistor (IGBT)) of each leg of the inverting module 13 of inverter 1, and by detecting a current flowing through the shunt resistor 20.

However, the output current is detected discontinuously according to the switching state of the switching element of the inverting module 13. Thus, a peak-current detection with considering the switching state of the switching element is required.

Figures 4, 5A:
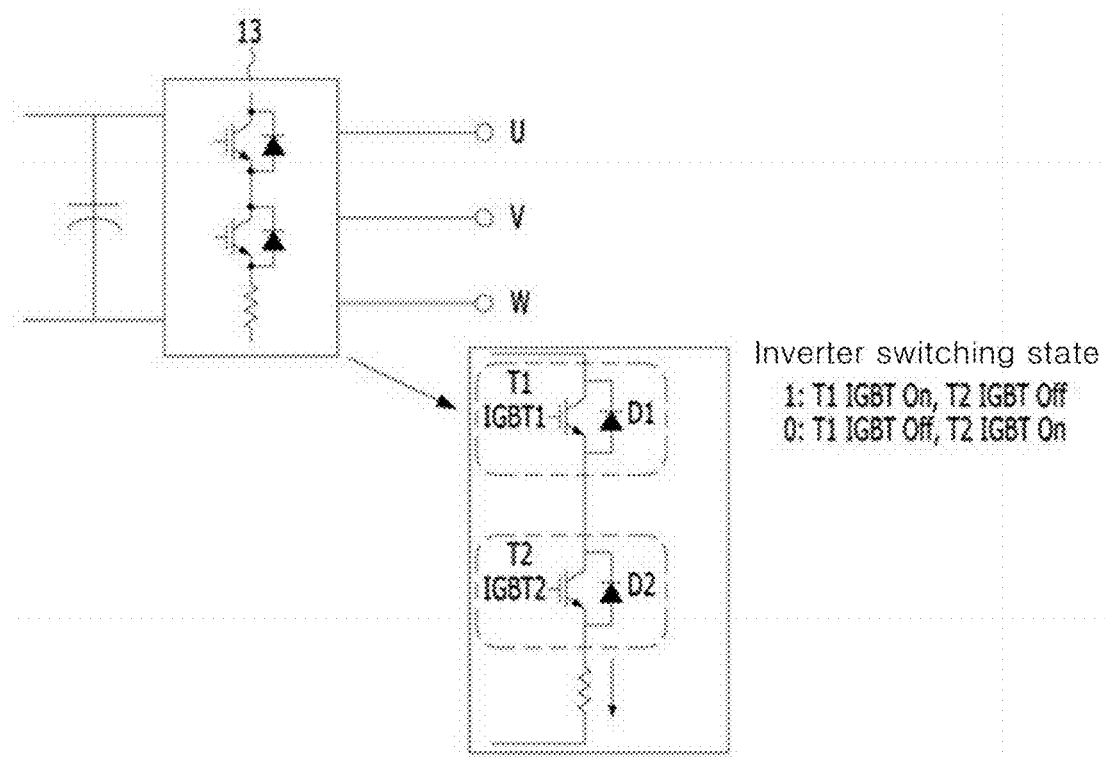

FIGS. 3A to 3H show a state of an inverter output current according to a switching state during a space vector pulse width modulation (SVPWM) control. FIG. 4 shows a switching element behavior according to an inverter switching state. FIG. 4 shows a definition of a switching element operation for each phase according to a switching state of FIGS. 3A to 3H.

FIGS. 5A to 5F show an operation of a switching element in each SVPWM sector. In the SVPWM control, an operation period of the switching element is divided into a zero vector duration consisting of T0 duration and an active vector duration consisting of T1 and T2 durations.

Figures 5F, 6:
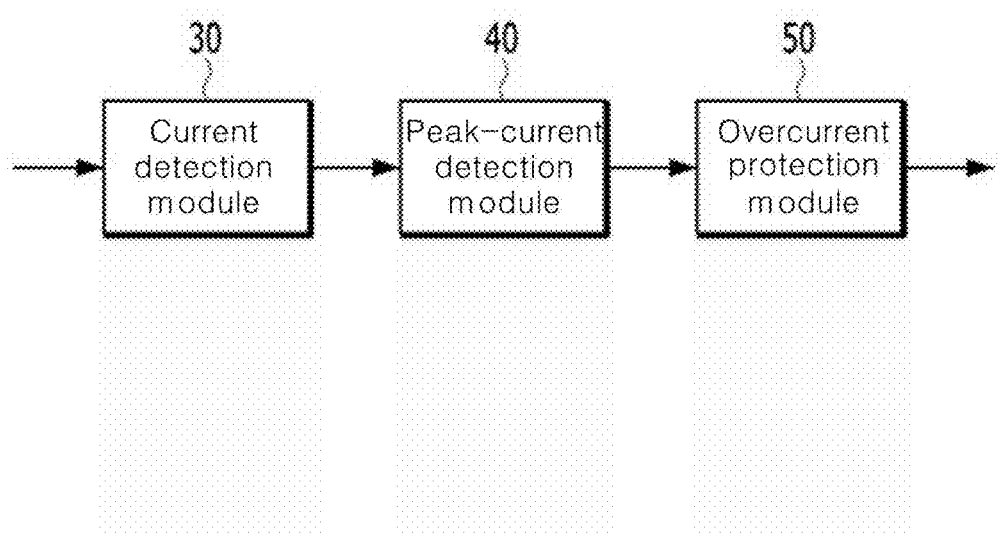
Figure 7:
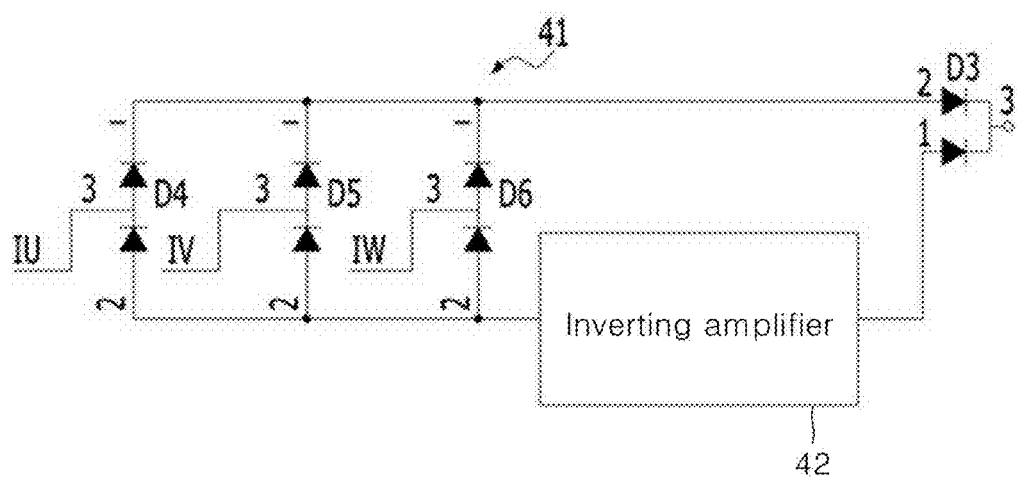
FIG. 7 shows a detailed configuration of a peak-current detection module in FIG. 6.

FIG. 6 is a block diagram of an inverter overcurrent protection system using a shunt resistor-based current detection scheme. FIG. 7 shows a detailed configuration of a peak-current detection module in FIG. 6. FIGS. 8A to 8E show each waveform output from each component in FIG. 6. FIG. 9 shows an output current path according to an inverter operation mode.

An inverter operation mode may be classified into a powering mode in which the inverter output current increases and a free-wheeling mode in which the inverter output current is extinguished. The powering mode occurs in the SVPWM active vector duration, while the free-wheeling mode occurs in the SVPWM zero vector duration.

Referring to FIG. 6, the inverter protection system for overcurrent protection for a general inverter includes a current detection module 30 for detecting a current output from a shunt resistor 20, a peak-current detection module 40 for detecting an instantaneous maximum output current and an overcurrent protection module 50 for performing overcurrent protection.

The current detection module 30 detects the current output from the shunt resistor 20 and adds an offset to the detected current and aligns and amplifies the current with the offset added. The peak-current detection module 40 detects a peak-current as an instantaneous maximum output current. Thereafter, the overcurrent protection module 50 performs an overcurrent suppression (OCS) operation for temporarily interrupting a PWM input to an switching element of the inverting module 13 or an overcurrent trip (OCT) operation for allowing an inverter trip to occur, based on the detected instantaneous peak-current.

Figure 8A:
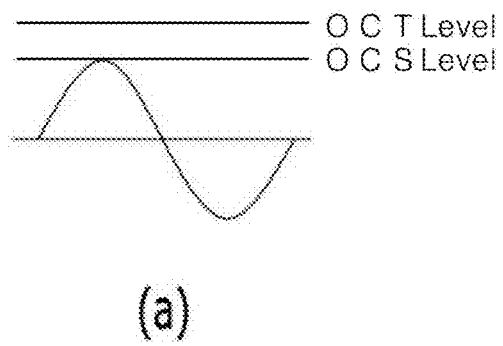
FIGS. 8A to 8E show each waveform output from each component in FIG. 6.
Figure 8B:
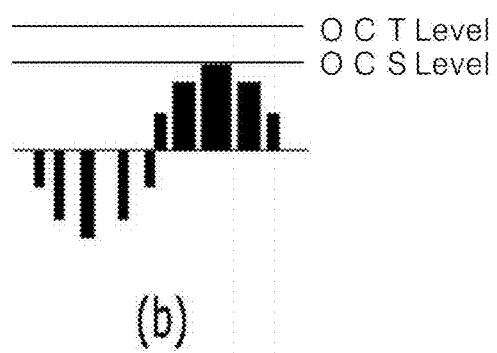
Figure 8C:
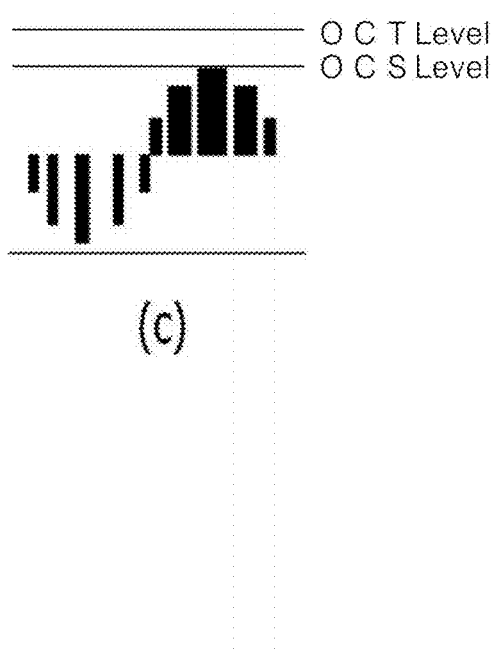
Figure 8D:
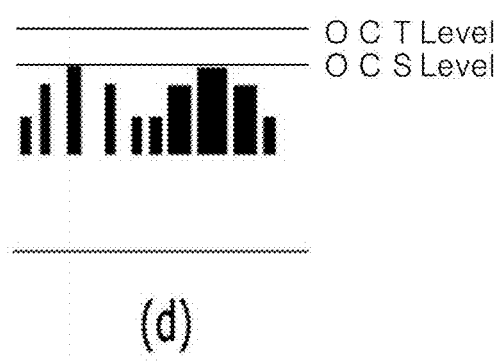
Figure 8E:
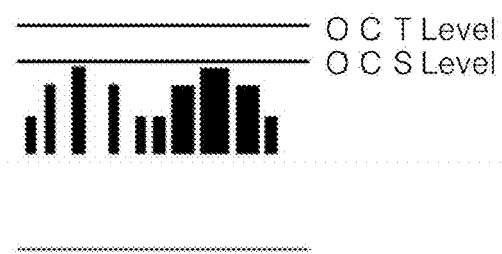
Figure 9:
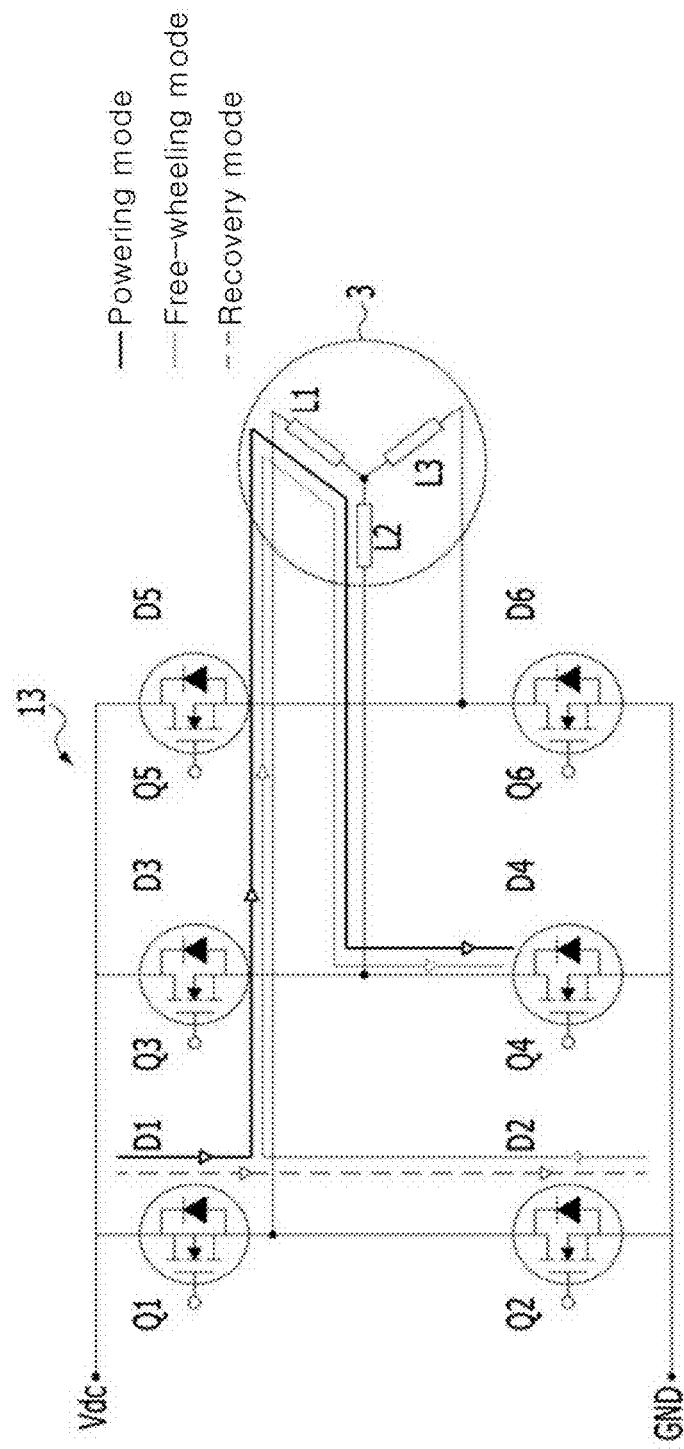
FIG. 9 shows an output current path according to an inverter operation mode.

In FIGS. 8A to 8E, FIG. 8A refers to a phase current output from the inverting module 13; FIG. 8B refers to a detected current using the shunt resistor 20; FIG. 8C refers to an output signal of the current detection module 30; FIG. 8D refers to an output signal of the peak-current detection module 40; and FIG. 8E refers to an output signal of the overcurrent protection module 50.

In the current detection schemes using the shunt resistor, the current can be detected only in a current-conducting duration due to a switching state of a lower switching element of each leg of the inverting module 13. Thus, the output current of the inverter is discontinuously detected as shown in FIGS. 8A to 8E.

The current detection module 30 adds an offset to the current detected by the shunt resistor 20, which, in turn, is amplified and then input to the peak-current detection module 40. Referring to FIG. 7, a rectifying module 41 of the peak-current detection module 40 outputs a rectified waveform of the detect current. Then, an inverting amplifier 42 of the peak-current detection module 40 inverts a negative signal of the waveform to a positive signal and outputs the inverted signal (refer to FIG. 8D).

The overcurrent protection module 50 receives the inverted signal and analyzes a level thereof and generates a OCS or OCT signal based on the input instantaneous peak-current level.

As shown in FIG. 9, the output current of the inverting module 13 is classified, based on the switching operation of the inverter, into a current in a powering mode in which energy is transferred from the DC link capacitor as the smoothening module 12 to the inverting module 13 such that the output current increases and a current in a free-wheeling mode in which energy of the motor 3 is extinguished.

The free-wheeling mode is divided into a first mode in which the SVPWM zero vector is applied to extinguish energy between the inverting module 13 and motor 3, and a second mode in which all the switching elements are turned off in the OCS operation such that energy between the DC link capacitor as the smoothening module 12 and the motor 3 is extinguished.

The powering mode occurs in an duration in which the SVPWM active vector is applied. When the SVPWM active vector is applied, the output current increases. In a overload condition, the output current continuously increases. Then, when the output current exceeds the overcurrent protection level, the overcurrent protection operation is performed. However, in the free-wheeling mode, the current generated in the powering mode is extinguished and, thus, the output current does not increase.

In the conventional current detection scheme using the shunt resistor, the peak-current detection by the peak-current detection module 40 is limited based on the switching state of the switching element of the inverting module 13.

That is, referring to FIGS. 5A to 5F, the SVPWM in one PWM period is composed of two zero vector durations, each consisting of T0 and two active vector durations consisting of T1 and T2 durations respectively. In the T1 duration, output current paths to lower switching elements of two phases of the inverting module 13 are formed. In the T2 duration, an output current path to a lower switching element of one phase of the inverting module 13 is formed. In this connection, in the T2 duration, an entirety of the instantaneous peak-current is applied through one lower switching element and thus the instantaneous peak-current detection is easy. However, in the T1 duration, the instantaneous peak-current is divided and applied into the two lower switching elements, and, thus, each detected instantaneous peak-current amount is reduced by a factor of ½. Thus, the detection of the instantaneous peak-current becomes difficult.

For this reason, in some durations in the powering mode, the overcurrent is not suppressed in the overcurrent situation. Thus, the output current exceeds the overcurrent level. In this case, when the overcurrent greater than a designed value occurs, the overcurrent increases a thermal stress on the switching element, such that the switching element may be damaged or a trip may be caused in an overheating situation.

The present disclosure addresses the above problems and provides an inverter peak-current detection device by which the instantaneous peak-current detection is realized throughout the entire powering mode period, thereby to enable an adequate overcurrent protection operation when the overcurrent occurs.

Figure 10:
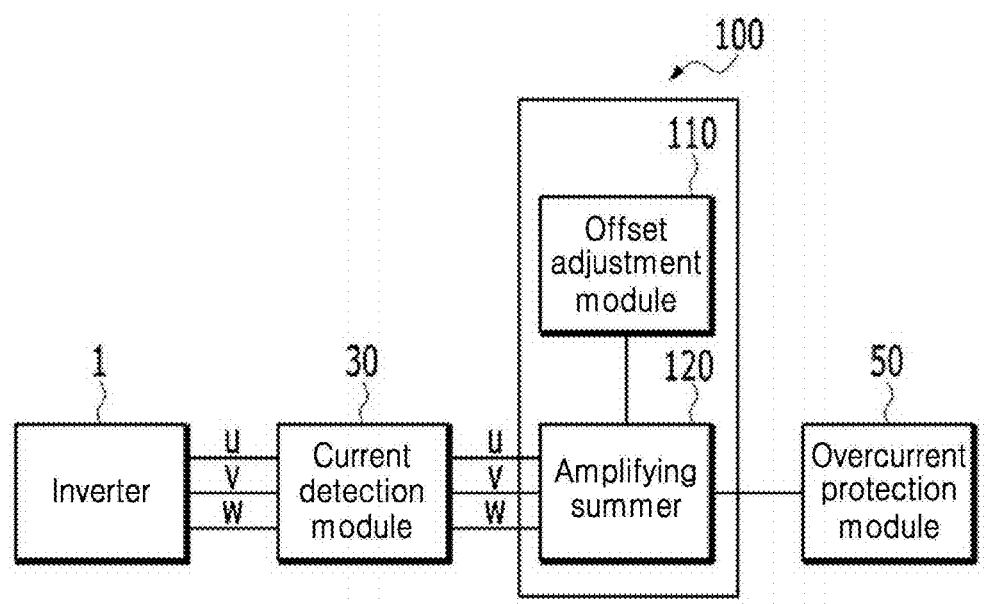
FIG. 10 is a schematic diagram for schematically illustrating an inverter overcurrent protection system in accordance with an embodiment of the present disclosure.
Figure 11:
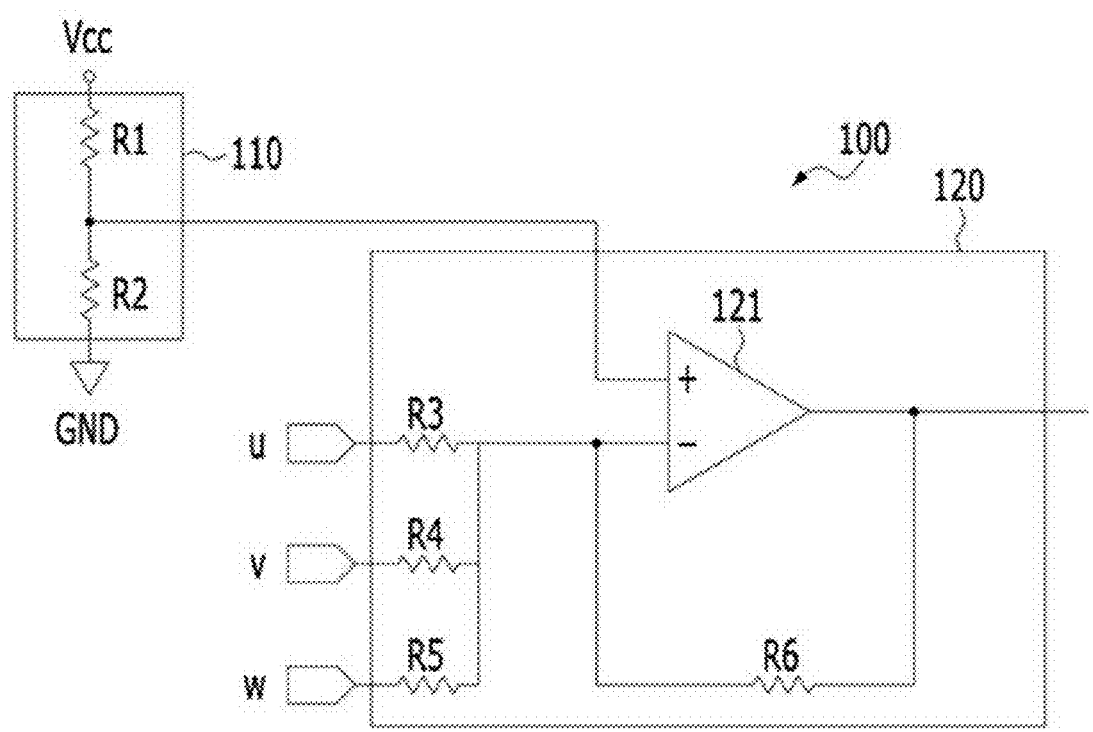
FIG. 11 shows a circuit diagram of a peak-current detection device in FIG. 10.

FIG. 10 is a schematic diagram for schematically illustrating an inverter overcurrent protection system in accordance with an embodiment of the present disclosure. FIG. 11 shows a circuit diagram of a peak-current detection device in FIG. 10.

As shown in FIG. 10, an inverter overcurrent protection system in accordance with an embodiment of the present disclosure may include a current detection module 30 for detecting an output current of the inverter 1, a peak-current detection device 100 for detecting an inverter peak-current from the inverter output current, and an overcurrent protection module 50 for performing an operation of protecting the inverter 1 based on the peak-current. Further, the peak-current detection device 100 may include an offset adjustment module 110 and an summer 120.

In one embodiment of the present disclosure, the current detection module 30 detects the output currents of one or two of the three-phase output currents of the inverting module 13 of the inverter 1 and provides the detected current(s) to the peak-current detection device 100. It is already described that the inverter output current may be provided via the shunt resistor 20 to the current detection module 30.

The current detection module 30 may detect the output current flowing through the shunt resistor 20 connected to each lower switching element of each leg of the inverting module 13 of the inverter 1.

The amplifying summer 120 may sum the output currents of the lower switching elements of the legs corresponding to two phases of the inverting module 13 input from the current detection module 30 and output the sum as a peak current. Alternatively, the amplifying summer 120 may output, as a peak current, the output current of the lower switching element of the leg corresponding to one phase of the inverting module 13 input from the current detection module 30.

The offset adjustment module 110 may adjust a level of a offset voltage of the amplifying summer 120 using offset adjustment resistors R1 and R2. The offset voltage may be defined as a voltage for removing the DC voltage generated in the amplifying summer 120, which is an analog circuit. The offset adjustment module 110 may provide the offset voltage to the amplifying summer 120 to remove the DC voltage. In this connection, the offset voltage may be adjusted using the offset adjustment resistors R1 and R2.

Referring to FIG. 11, the amplifying summer 120 may be embodied as an operational amplifier (OP AMP) 121. In one embodiment of the present disclosure, three-phases inverter output currents may be input to an inverting input terminal of the operational amplifier 121. However, an embodiment of the present disclosure is not limited to the circuit configuration of FIG. 11. The amplifying summer 120 may be embodied as a variety of circuit configurations to sum 3-phases inverter output currents. For example, the amplifying summer 120 may be configured so that the three-phases inverter output currents are input to a non-inverting input terminal of the operational amplifier OP AMP.

In the SVPWM active vector duration, a current pathway to the lower switching element of the 1-phase leg or to the lower switching elements of the 2-phases legs of the inverting module 13 may be formed.

In the SVPWM T2 duration where the current pathway to the lower switching element of one phase leg is formed, a flow path of inverter peak-current to the lower switching element of one phase leg.

In the SVPWM T1 duration where the current pathway to the lower switching elements of the two phases legs is formed, the flow path of the inverter peak-current to the lower switching elements of the two phase legs may be formed (in other words, the flow path of the inverter peak-current to an upper switching element of a remaining phase leg may be formed). In this case, according to KCL (Kirchhoff's Current Law), the inverter peak-current may be equal to the sum of the currents flowing through the lower switching elements of the two phase legs.

The peak-current detection device 100 having the amplifying summer 120 according to one embodiment of the present disclosure may detect the instantaneous peak-current while the inverter output current of 1-phase or the inverter output currents of 2-phases are input to the amplifying summer 120 in the active vector duration. Thus, in the SVPWM T2 duration where the current pathway to the lower switching element of one phase leg is formed, and in the SVPWM T1 duration where the current pathway to the lower switching elements of the two phases legs is formed, the instantaneous peak-current may be detected. That is, in the entire period of the powering mode, the instantaneous peak-current may be detected.

Figure 12A:
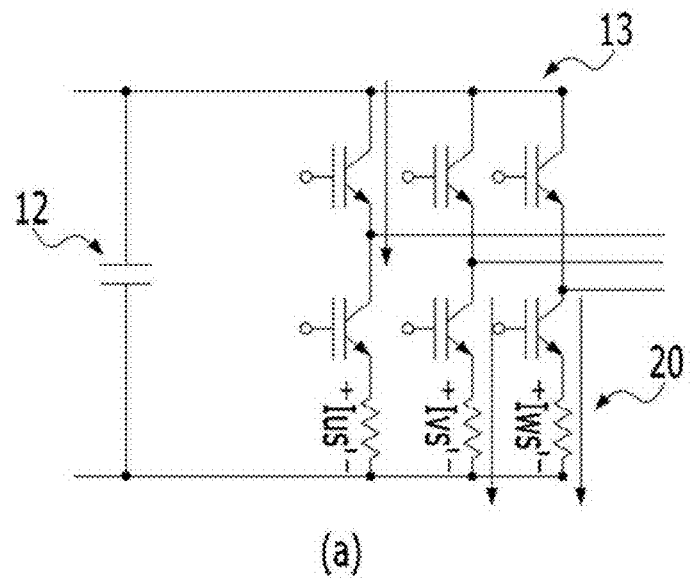
FIGS. 12A and 12B show an example of a current pathway in a SVPWM sector 1.
Figure 12B:
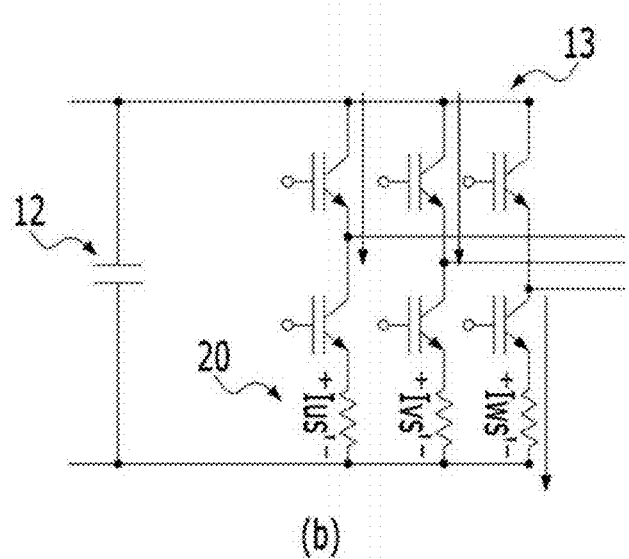

FIGS. 12A and 12B show an example of a current pathway in a SVPWM sector 1. FIG. 12A indicates the SVPWM T1 duration where the current pathway to the lower switching elements of the two phases legs is formed. FIG. 12B indicates the SVPWM T2 duration where the current pathway to the lower switching element of one phase leg is formed.

Referring to FIG. 12B, in the SVPWM T2 duration where the current pathway to the lower switching element of a W phase leg is formed, the current detection module 30 detects the W phase current. The U phase and V phase currents are not detected. In this connection, the inverter instantaneous peak-current has the W phase.

The peak-current detection device 100 may receive the W-phase current and detect the peak-current as the W-phase current. Then, the W phase instantaneous peak-current may be output from the device 100 to the overcurrent protection module 50.

Referring to FIG. 12A, in the SVPWM T1 duration where the current pathway to the lower switching elements of V and W phases legs is formed, the current detection module 30 detects the V phase current and the W phase current. The current detection module 30 may not detect the U phase current, where the current pathway to an upper switching element of the U phase leg is formed. In this connection, the inverter instantaneous peak-current has the U-phase. The V-phase and W-phase currents detected from the current detection module 30 are input to the peak-current detection device 100 in accordance with one embodiment of the present disclosure. The amplifying summer 120 sums the V-phase and W-phase currents and outputs the U phase current as an inverter instantaneous peak-current. The U-phase instantaneous peak-current may be input to the overcurrent protection module 50.

In the SVPWM sector 2 to sector 6, the peak-current detection device 100 in accordance with one embodiment of the present disclosure may detect the inverter instantaneous peak-current in the same way as in the SVPWM sector 1.

Upon receiving the peak-current from the peak-current detection device 100, the overcurrent protection module 50 may perform an OCS operation for temporarily interrupting the PWM input to the switching element of the inverting module 13 or an OCT operation for performing an inverter tripping operation, based on the detected instantaneous peak-current.

That is, the peak-current detection device in accordance with one embodiment of the present disclosure may detect the inverter instantaneous peak-current in an entire active vector duration. This may allow performing an overcurrent protection operation stably in the entire period of the inverter powering mode.

A following table 1 compares the peak-current detection via the conventional rectifier circuit based scheme of FIG. 7 and the peak-current detection in accordance with one embodiment of the present disclosure.

TABLE 1

| | SVPWM switching state | | | |
|---|---|---|---|---|
| Scheme | Zero vector (T0, 000) | Active vector (T1) | Active vector (T2) | Zero vector (T0, 111) |
| Conventional rectifier circuit based scheme | ○ | Δ | ○ | X |
| Present scheme | X | ○ | ○ | X |
| Inverter operation mode | Free-wheeling Mode | Powering mode | Powering mode | Free-wheeling mode |

As shown above, in the conventional rectifier circuit based scheme, the peak-current cannot be detected at the T1 duration. However, according to one embodiment of the present disclosure, the peak-current can be accurately detected in the entire period of the powering mode, such that the inverter 1 can be safely protected from the overcurrent.

Figure 13:
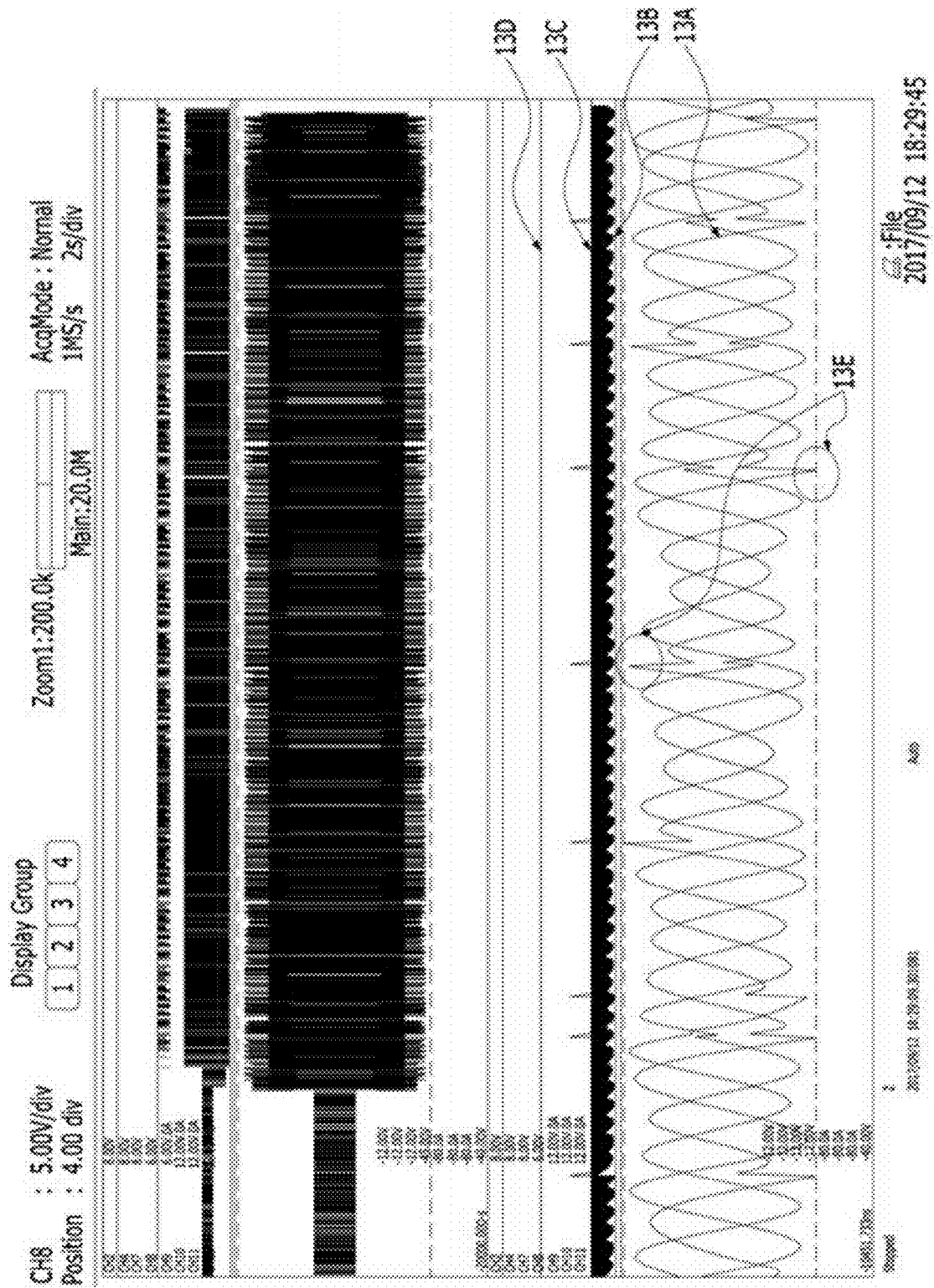
FIG. 13 is an example for illustrating performing overcurrent protection according to one embodiment of the present disclosure.

FIG. 13 is an example for illustrating performing the overcurrent protection according to one embodiment of the present disclosure.

In FIG. 13, a reference numeral 13A indicates an inverter output current; a reference numeral 13B refers to an overcurrent suppression (OCS) level; a reference numeral 13C indicates an instantaneous peak-current signal; a reference numeral 13D indicates a OCS operation signal; and a reference numeral 13E shows a result of the overcurrent protection operation.

According to one embodiment of the present disclosure, the system may perform the overcurrent protection operation depending on the set OCS level. The instantaneous peak-current detection may be achieved during the entire period of the inverter powering mode. Thus, a stable overcurrent suppression operation can be performed.

In one embodiment of the present disclosure, the example in which the inverter output current is detected and the amplifying summer only detects the peak-current has been described. However, the present disclosure is not limited thereto. In another embodiment, the amplifying summer may sum the inverter output currents to detect the ground fault therefrom or to detect an open phase of the inverter output current therefrom.

It will be apparent to those skilled in the art that various modifications and variations may be made in the present invention without departing from the spirit of the present disclosure. The technical scope of the present disclosure is not limited to the contents described in the embodiments but should be determined by the claims and equivalents thereof.

What is claimed is:

1. A device for detecting an instantaneous maximum output current of an inverting module as a peak-current thereof, wherein the inverting module converts a direct current (DC) link voltage to an alternate current (AC) voltage, and includes three-phases legs, wherein each leg has lower and upper switching elements connected in series, wherein the device comprises:
    shunt resistors, wherein each of the shunt resistors is serially connected to a lower switching element of each leg of the inverting module;
    a current detection module configured for detecting output currents from signal outputs from the shunt resistors;
    a summer configured for receiving and summing the detected output currents from the current detection module and outputting the instantaneous maximum output current of the inverting module as the peak-current thereof; and
    an offset adjustment module configured for supplying an offset voltage to the summer, wherein the offset voltage is defined as a voltage for removing a DC voltage generated in the summer.

2. The device of claim 1, wherein the summer includes an operational amplifier.

3. The device of claim 2, wherein the detected output currents from the current detection module are input to an inverting input terminal of the operational amplifier.

4. The device of claim 2, wherein the detected output currents from the current detection module are input to a non-inverting input terminal of the operational amplifier.

5. The device of claim 1, wherein the three phases include first, second, and third phases, wherein for a duration in which a current pathway to a lower switching element of each of first and second phases legs of the three-phases legs is established, the current detection module detects first and second phases output currents,
    wherein the summer sums the first and second phases output currents and outputs a third phase output current as the peak-current of the inverting module.

6. The device of claim 1, wherein the three phases include first, second, and third phases, wherein for a duration in which a current pathway to a lower switching element of a first phase leg is established, the current detection module detects a first phases output current,
    wherein the summer outputs the first phase output current as the peak-current of the inverting module.

* * * * *